F. BARZ.
CLUTCH MECHANISM.
APPLICATION FILED MAY 8, 1911.
1,069,917.
Patented Aug. 12, 1913.
3 SHEETS—SHEET 1.
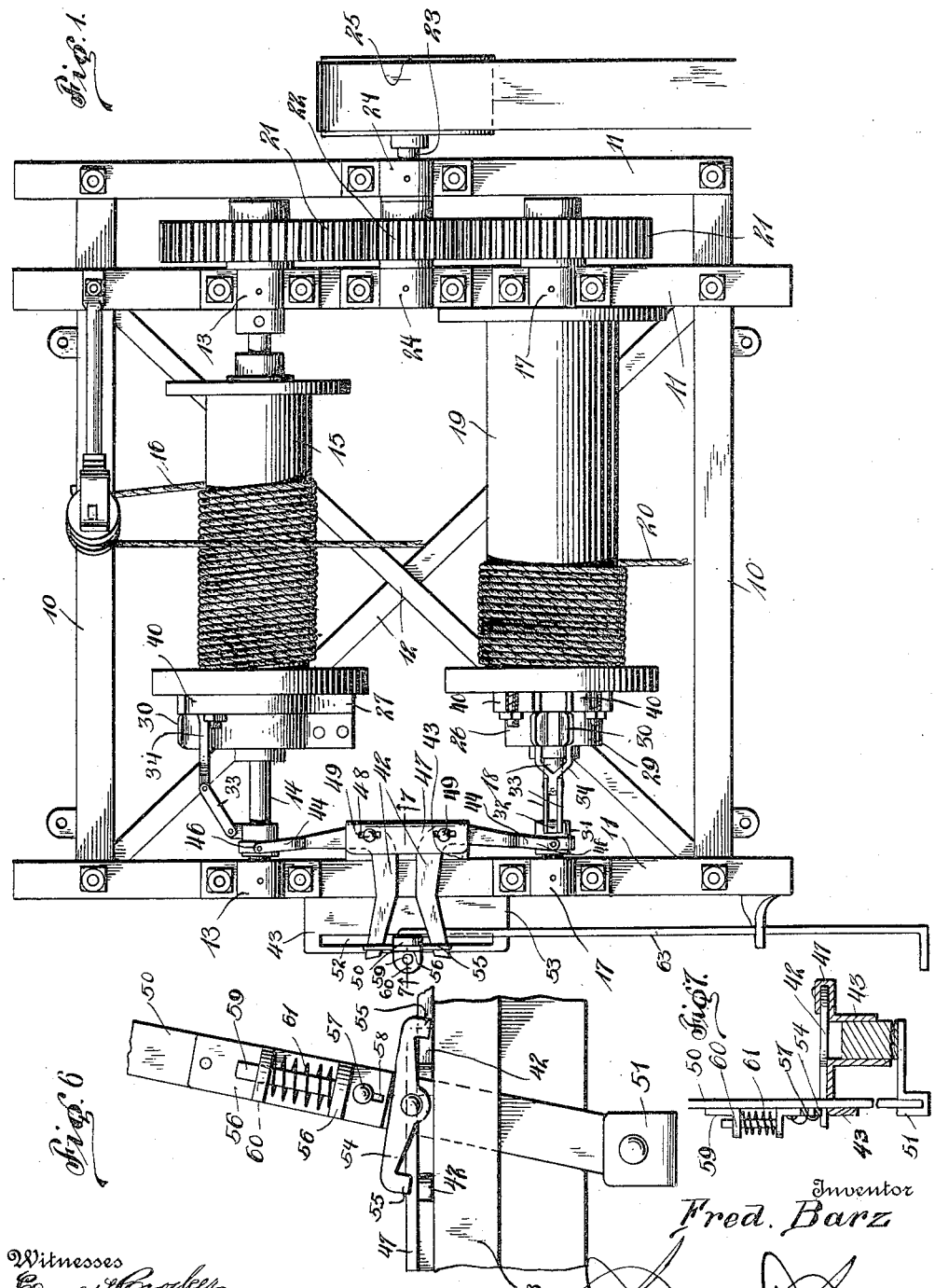
Witnesses
Ernest Crocker
Francis Boyle
Inventor
Fred. Barz
By
Attorneys

F. BARZ.
CLUTCH MECHANISM.
APPLICATION FILED MAY 8, 1911.

1,069,917.

Patented Aug. 12, 1913.
3 SHEETS—SHEET 2.

Witnesses
Ernest Crocker
Francis Boyle

Inventor
Fred. Barz
By
Attorneys

F. BARZ.
CLUTCH MECHANISM.
APPLICATION FILED MAY 8, 1911.

1,069,917.

Patented Aug. 12, 1913.

3 SHEETS—SHEET 3.

Witnesses
Ernest Crocker
Francis Boyle

Inventor
Fred. Barz

By
Attorneys

UNITED STATES PATENT OFFICE.

FREDERICK BARZ, OF VENTURA, IOWA.

CLUTCH MECHANISM.

1,069,917.  Specification of Letters Patent.  Patented Aug. 12, 1913.

Application filed May 8, 1911. Serial No. 625,827.

*To all whom it may concern:*

Be it known that I, FREDERICK BARZ, a citizen of the United States, residing at Ventura, in the county of Cerro Gordo, State of Iowa, have invented certain new and useful Improvements in Clutch Mechanisms; and I do hereby declare the following to be a full, clear, and exact description of the invention, such as will enable others skilled in the art to which it appertains to make and use the same.

This invention relates to clutches for hay unloading devices, and has for an object to provide an improved and simplified clutch mechanism for selectively throwing the fork elevating and returning drums in gear with the driving pulley.

A further object of the invention is to provide an improved lever for shifting the clutch mechanism of either pulley to operative or released position.

With the above objects in view the invention consists in certain novel details of construction and combination of parts hereinafter fully described and claimed, it being understood that various modifications may be made in the minor details of construction within the scope of the appended claims.

Figure 3:
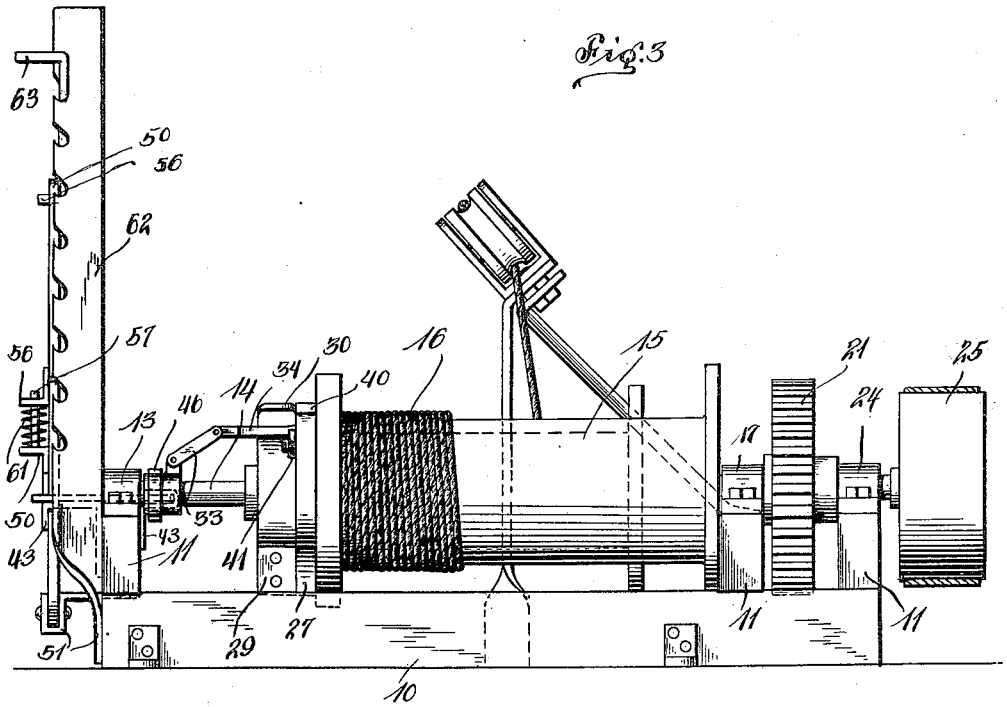
Figure 2:
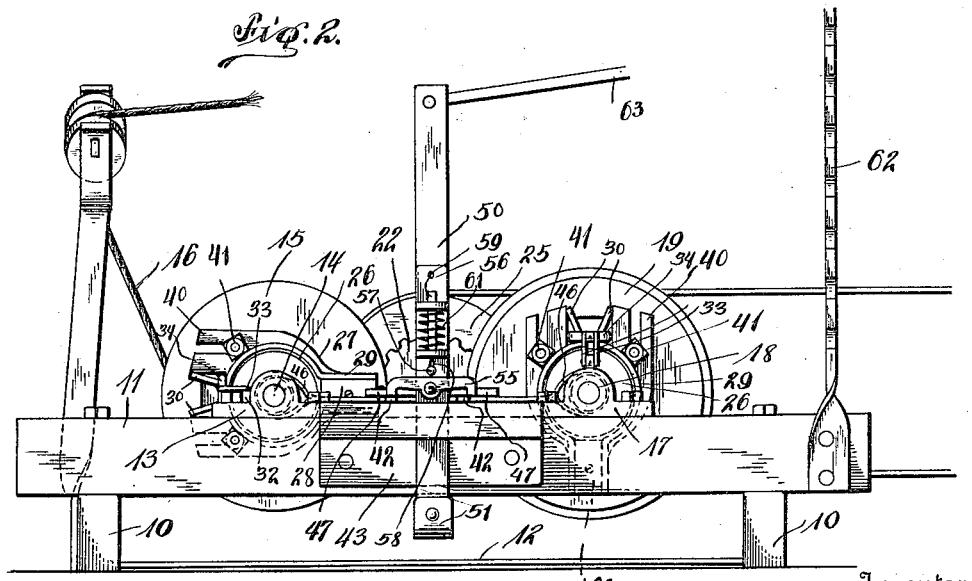
Figure 4:
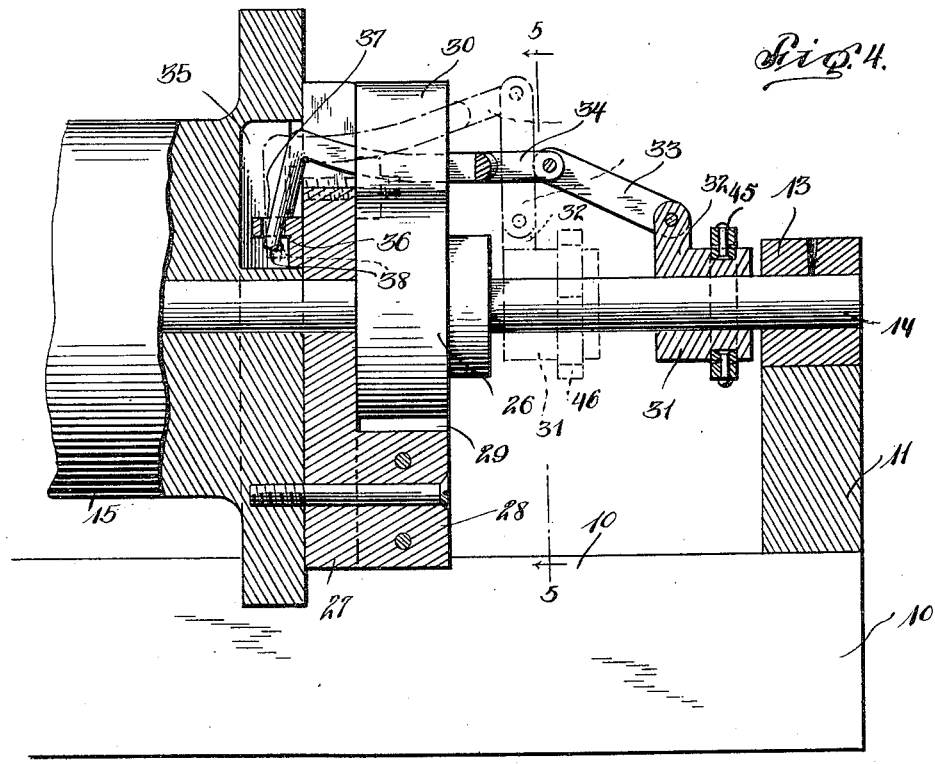
Figure 5:
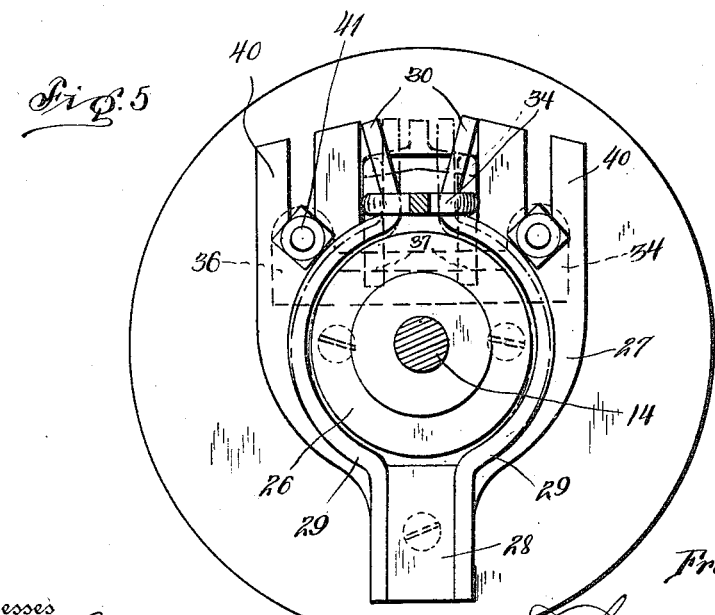

In the accompanying drawings forming part of this specification:—Figure 1 is a plan view of a hay unloading device embodying my improvements. Fig. 2 is an end elevation of the device. Fig. 3 is a side elevation of the device with the parts in the positions shown in Fig. 2. Fig. 4 is an enlarged fragmentary view with parts in elevation and parts in section showing the clutch mechanism of one drum in released position and dotted in operative position. Fig. 5 is a cross sectional view taken on the line 5—5 Fig. 4. Fig. 6 is a fragmentary view in elevation showing the operating lever in operative position. Fig. 7 is a cross sectional view taken on the line 7—7 Fig. 1.

Referring now to the drawings in which like characters of reference designate similar parts. 10 designates side sills, and 11 end sills. the end sills being preferably bolted to the top faces of the side sills. A pair of diagonal braces 12 are bolted at their outer ends to the ends of the side sills and prevent displacement of the sills. Journaled in suitable bearings 13 arranged on the end sills is a shaft 14, this shaft being equipped with a drum 15 upon which is coiled a fork returning cable 16. Arranged in suitable bearings 17 are the ends of a shaft 18 which carries a drum 19 upon which is coiled a fork elevating cable 20. The outer ends of both shafts are equipped with spur gears 21 which mesh with a pinion 22 carried upon a driving shaft 23 journaled in suitable bearings 24 arranged on the end sills intermediate the gears, this shaft being equipped on its outer end with a pulley 25 which may be driven by any desired motive power.

For selectively causing the rotation of either the fork elevating or fork returning drum each drum is equipped with a clutch mechanism constructed as follows: Keyed to the shaft at a slight distance from the drum head is a disk 26, and fixed to the drum head between the disk and head is a plate 27 from one side of which a lug 28 projects, this lug being equipped on its opposite sides with oppositely bowed resilient bands 29 which embrace the disk and terminate on the opposite side of the disk in divergent fingers 30, which when pressed together cause the bands to bind upon the disk and since the bands are fixedly connected to the drum cause the rotation of the drum. Normally the bands loosely embrace the disk so that the drum may idle on the shaft. For tightening the bands against the disk, a grooved sleeve 31 is slidingly fitted on the shaft and is provided with a radial lug 32 to the opposite sides of which are pivotally connected links 33 between the outer ends of which is interposed the shank of a yoke cam 34 the legs of which engage the opposite outer sides of the band fingers adjacent to the bands. The legs are bent abruptly at their free ends and are pivotally connected to a fulcrum plate about to be described. Formed in the drum head is an orifice 35 within which is seated an angle iron fulcrum plate 36, the horizontal leg of the fulcrum plate being provided with orifices 37 which loosely receive the terminals of the cam legs, the latter being headed up after being passed through the horizontal leg of the fulcrum plate as shown at 38. The vertical leg of the fulcrum plate is provided with spaced ears 39 through which and slots 40 formed in the plate 27, are passed bolts 41, these bolts adjustably securing the fulcrum plate to the plate 27. By adjusting this fulcrum plate along the plate 27, the pivoted ends of the cam legs may be raised or lowered in order to vary the points of engagement of the cam legs with the divergent fingers of the clutch bands whereby the latter may be normally held spaced a slight or great distance from the disk, so that upon shifting upwardly of the cam shank the clutch bands may be caused to engage slowly or rapidly as desired. It is clear that when the sleeve is slid inwardly toward the disk that the links will be caused to assume a more upright position and elevate the shank of the cam, this elevation of the cam shank causing the cam legs to move outwardly upon the divergent fingers of the cam bands whereby the fingers are moved toward each other and the bands tightened upon the drum.

For selectively shifting either of the sleeves into operative position, a pair of bell crank levers 42 are pivoted at their elbows on an angle iron bracket 43 fixed to the inner face of the adjacent end sill. One leg of each lever terminates in a yoke 44 the terminals of which are orificed and engage the gudgeons 45 of a ring 46 which fits in the groove of the serrated sleeve. By rocking either bell crank lever upon its pivot the related sleeve is shifted toward or away from the related drum head so that the clutch bands on this drum are moved into or out of operative position. In order to prevent binding between the ring and sleeve as the bell crank lever is rocked upon its pivot, the angle iron bracket is provided with an angular lip 47 which extends over the upper faces of both bell crank levers and both the lip and angle iron bracket are provided with registering slots 48 in which the pivots 49 of the bell crank lever may freely slide.

An operating lever 50 works between the free legs of the bell crank levers, and when shifted in one direction engages with and moves the free leg of one of the bell crank levers and when shifted in an opposite direction engages with and shifts the free leg of the other bell crank lever. The lever 50 is pivoted at its lower end to a bracket 51 and works in a slot 52 formed in an inverted L-shaped bracket 53 secured to the outer face of the end sill, this bracket having its horizontal leg bearing against and forming an abutment for the free legs of the bell crank levers. In order to lock the lever in either of its operative positions, a rock pawl 54 is pivoted centrally upon the lever and is provided at its opposite ends with fingers 55 of sufficient size to receive the bell crank lever free legs. Either notched end of the rock pawl is held tightly down against the free leg of the bell crank lever which is in operative position, the pawl clamping the free leg of the lever against the abutment plate. To hold the pawl down, a pair of angle irons 56 are mounted upon the outer face of the lever the uppermost angle iron being fixed to the lever and the lowermost angle iron being slidably fitted to the lever through the instrumentality of a pin 57 passed through a slot 58 in the angle iron. A stem 59 is fixed to the slotted angle iron and is slidingly fitted in an opening 60 formed in the stationary angle iron. A helical spring 61 is seated on the stem and bears with its opposite terminal convolutions against the angle irons and normally holds the sliding angle iron at its lowest limit of movement, as the operating lever is shifted in either direction, one leg of the rock pawl will bear against the free leg of the bell crank lever being shifted and be elevated, this elevation of the rock pawl moving the slotted angle iron against the pressure of its spring, the spring now exerting a downward pressure sufficient to cause the rock pawl to bear against and clamp the shifted bell crank lever tightly against the abutment. Upon shifting of the operating lever to a central position between the angle iron levers, the rock pawl will move to a substantially horizontal position and will engage neither of the angle iron levers.

It will thus be seen that by means of the spring pressed rock pawl the lever when shoved to its limit of movement in either direction is automatically locked against return movement until manually returned. In order that this lever may be operated from the top of a load of hay, a notched standard 62 is fixed at its lower end upon the end sill and a pull rod 63 is secured at one end to the free end of the operating lever, the free end of this pull rod being led upwardly into convenient reach of the operator and being selectively engaged in any particular notch of the standard which will attain this end.

In operation the operating lever is manually shifted in one direction to throw in the clutch of the drum 15 and wind the cord 16 thereon to return the fork from the loft to the load of hay, and the lever may be then shifted in the opposite direction to actuate the drum 19 and wind the cord 20 thereon to elevate the fork with its load to the loft.

What is claimed, is:—

1. In combination a supporting frame, shafts on said frame, a clutch connection on each shaft, bell crank levers pivoted at their elbows on said frame and each having a leg operatively connected to a related clutch, a lever pivoted to said frame intermediate the free legs of said bell crank levers and operating to selectively shift said levers for independently actuating said clutches, an abutment underlying and bearing against the free legs of said levers, and a spring pressed pawl pivoted intermediate the ends on said operating lever operating to terminally engage and clamp the free leg of one of the bell crank levers to said abutment when the lever is moved to its limit of movement in either direction.

2. In combination a supporting frame, a shaft thereon, a loose revoluble member on said shaft, a disk fixed to said shaft, a pair of resilient clamping strips carried by said revoluble member and encircling said disk, said clamping strips terminating in diverging lips, a yoke pivoted on said revoluble member and having branches engaging said lips, and operating to move said clamping strips into frictional engagement against said disk and lock the disk and revoluble member for simultaneous rotation, a loose sleeve on said shaft operatively connected to said yoke for rocking the yoke to operative and released positions, and means for sliding said sleeve toward or away from said revoluble member whereby to actuate said yoke.

In testimony whereof, I affix my signature, in presence of two witnesses.

FRED. BARZ.

Witnesses:
I. B. BLEEKER,
F. A. ARNOLD.

Copies of this patent may be obtained for five cents each, by addressing the "Commissioner of Patents, Washington, D. C."